(12) United States Patent
Petruzzi

(10) Patent No.: US 10,127,613 B2
(45) Date of Patent: *Nov. 13, 2018

(54) AUDITING CUSTODIAL ACCOUNTS

(71) Applicant: Christopher R. Petruzzi, San Clemente, CA (US)

(72) Inventor: Christopher R. Petruzzi, San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,193

(22) Filed: Apr. 1, 2016

(65) Prior Publication Data

US 2016/0358263 A1  Dec. 8, 2016

Related U.S. Application Data

(63) Continuation of application No. 12/493,188, filed on Jun. 27, 2009, now Pat. No. 9,305,315.

(51) Int. Cl.
*G06F 17/30* (2006.01)
*G06Q 40/06* (2012.01)
*G06Q 20/02* (2012.01)
*G06Q 30/02* (2012.01)

(52) U.S. Cl.
CPC ....... *G06Q 40/06* (2013.01); *G06F 17/30424* (2013.01); *G06Q 20/02* (2013.01); *G06Q 30/0241* (2013.01)

(58) Field of Classification Search
CPC ........ G06Q 20/10; G06Q 20/02; G06Q 20/04; G06Q 30/04; G06Q 30/02; G06Q 10/107
USPC ........................................................ 707/752
See application file for complete search history.

(56) References Cited

U.S. PATENT DOCUMENTS

| | | | | |
|---|---|---|---|---|
| 6,016,482 A * | 1/2000 | Molinari | ................ | G06Q 20/10 705/35 |
| 6,493,683 B1 * | 12/2002 | David | ................ | G06Q 20/02 705/37 |
| 7,310,615 B2 * | 12/2007 | Lewis | ................ | G06Q 30/04 705/1.1 |
| 7,451,103 B1 * | 11/2008 | Boyle | ................ | G06Q 20/10 705/35 |
| 8,055,575 B2 * | 11/2011 | Grody | ................ | G06Q 40/00 705/37 |
| 9,305,315 B2 * | 4/2016 | Petruzzi | ................ | G06Q 40/06 |
| 9,324,087 B2 * | 4/2016 | Routson | ................ | G06Q 30/02 |
| 2002/0194097 A1 * | 12/2002 | Reitz | ................ | G06Q 10/107 705/36 R |
| 2004/0002910 A1 * | 1/2004 | Mizukami | ................ | G06Q 20/04 705/36 R |
| 2004/0162772 A1 * | 8/2004 | Lewis | ................ | G06Q 30/04 705/34 |
| 2005/0187852 A1 * | 8/2005 | Hwang | ................ | G06Q 40/02 705/36 R |
| 2006/0248099 A1 * | 11/2006 | Barrett | ................ | G06F 21/34 |

(Continued)

*Primary Examiner* — Jean M Corrielus
(74) *Attorney, Agent, or Firm* — Donald L. Wenskay

(57) ABSTRACT

According to one embodiment of the present invention, a system for auditing custodian accounts is provided. The system includes a database system receiving customer and custodian information. A sorting processor performs a sort operation on the received customer and custodian information. A customer and custodian matching processor identifies matches between the sorted customer and custodian information. An interface unit outputs information relating to the existence of matches and non-matches between the customer and custodian information.

19 Claims, 3 Drawing Sheets

(56) References Cited

U.S. PATENT DOCUMENTS

| | | | | |
|---|---|---|---|---|
| 2006/0293981 A1* | 12/2006 | McNelley | G06Q 20/3821 | 705/35 |
| 2007/0250426 A1* | 10/2007 | Demirjian | G06Q 30/02 | 705/36 R |
| 2009/0138387 A1* | 5/2009 | Boyle | G06Q 20/10 | 705/30 |
| 2009/0164349 A1* | 6/2009 | Demirjian | G06Q 30/02 | 705/30 |
| 2011/0289569 A1* | 11/2011 | Barrett | G06F 21/34 | 726/6 |
| 2012/0011054 A1* | 1/2012 | Grody | G06Q 40/00 | 705/37 |
| 2012/0185373 A1* | 7/2012 | Grody | G06Q 40/04 | 705/37 |
| 2013/0007022 A1* | 1/2013 | Petruzzi | G06Q 40/06 | 707/752 |
| 2016/0342999 A1* | 11/2016 | Routson | G06Q 30/02 | |

* cited by examiner

2

AUDITING CUSTODIAL ACCOUNTS

BACKGROUND

The present invention relates to auditing, and more specifically, to techniques for facilitating the auditing the financial records of a custodian of customer financial accounts.

The investment, banking, and insurance industries have custody of many kinds of securities, (shares, bonds, insurance products, etc.) and other assets such as real estate. Globally, there is estimated to be about $100 trillion under management by various investment businesses and individuals. Governments have established agencies for regulating the investment industry. For example, in the United States, the Securities Exchange Commission (SEC) is responsible to regulating this industry. Similarly, insurance companies, banks, Savings and Loans, and Credit Unions have federal and/or state regulations. These regulations often require regular audits of the books of the regulated financial businesses. Despite such regulations and audits, there is still a great deal of mismanagement, and outright fraud related to custody. The recent disclosure of an alleged $50 billion Ponzi scheme perpetrated by Bernie Madoff highlights the seriousness of the problem with fraud in which a custodian or fiduciary does not have the assets which it purports to hold for the accounts of customers.

SUMMARY

According to one embodiment of the present invention, a system comprises: a database system receiving customer and custodian information; sorting processor performing a sort operation on the received customer and custodian information; customer and custodian matching processor for identifying matches between the sorted customer and custodian information; and interface for outputting information relating to the existence of matches and non-matches between the customer and custodian information.

According to another embodiment of the present invention, a method comprises: receiving customer information from a customer relating to customer accounts and associated custodians; receiving custodian information from a custodian relating to customer accounts managed by the custodian; sorting the customer and the custodian information; finding matches between the sorted customer and custodian information; and providing information regarding matching and non-matching customer and custodian information.

According to another embodiment of the present invention, a computer program product for facilitating an audit comprises: a computer usable medium having computer usable program code embodied therewith, the computer usable program code comprising: computer usable program code configured to: receive customer information relating to customer accounts and associated custodians; receive custodian information relating to customer accounts managed by a custodian; sort the customer and the custodian information; find matches between the sorted customer and custodian information; and provide information regarding matching and non-matching customer and custodian information.

DETAILED DESCRIPTION

Figure 1:
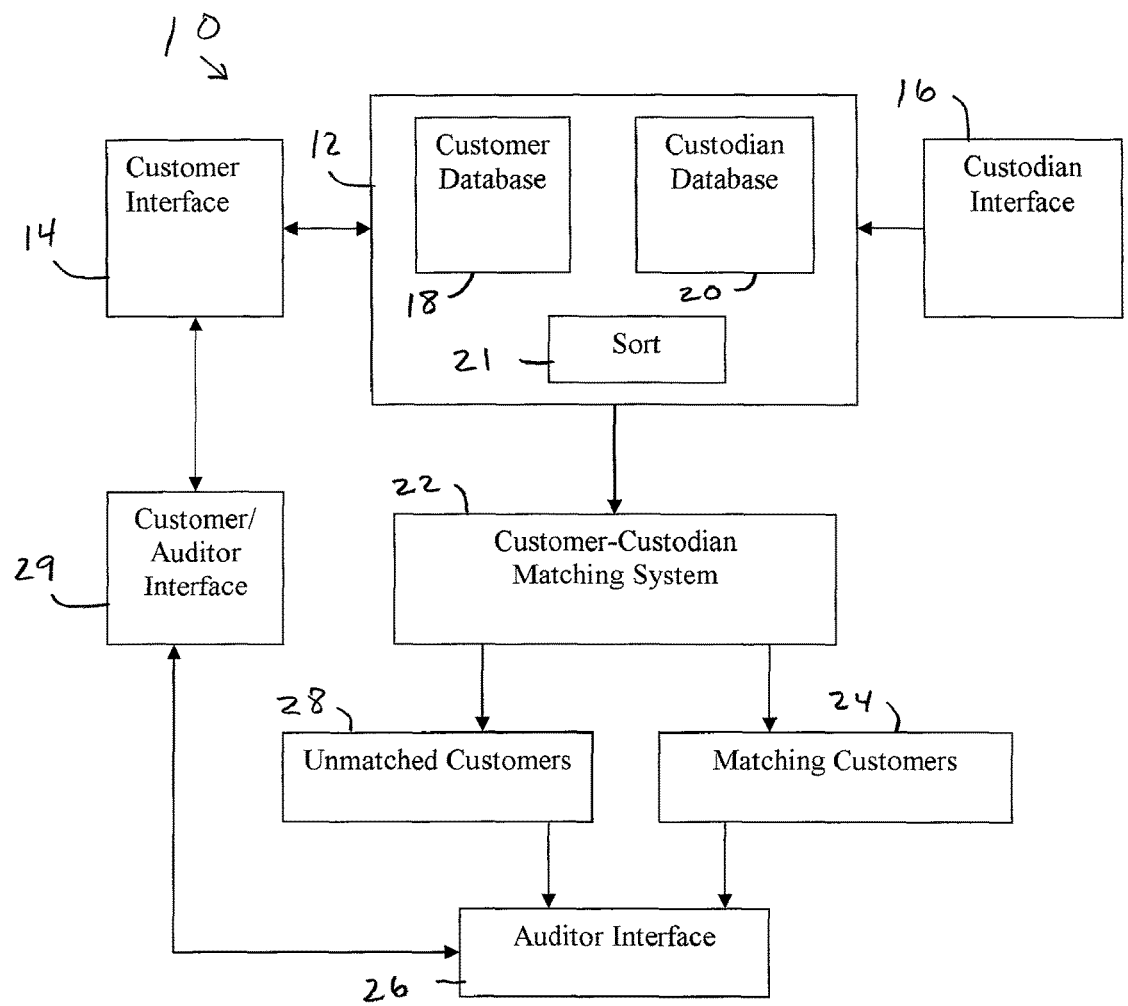
FIG. 1 shows a diagram of an auditing database system in accordance with an embodiment of the invention.

Embodiments of the invention provide techniques for making facilitating auditing customer accounts of businesses in the investment industry. As described above, there is a great deal of fraud in the investment industry. Even heavily regulated segments of the industry, where audits are performed, still experience significant levels of mismanagement and fraud. In the aftermath of the above-discussed Madoff scheme, regulatory agencies are trying to find ways to prevent such fraud in the future.

As used herein, the term "investment industry" refers to businesses, institutions, and individuals engaged in managing, investing, holding, or who have any kind of responsibility for the assets of another party or liabilities to customers or have represented to customers that they have conveyed assets to another party (as would be done by insurance agents or introducing brokers). These assets may consist of, for example, stocks, bonds, mutual funds, mortgages, bonds, futures, and any other type of financial instruments, products, securities, insurance policies, annuities, etc. As used herein, the term "custodian" is used to describe all of the various kinds of businesses, trustees and other entities in the investment industry (as defined above), who have custody, responsibility, or a fiduciary duty with regard to assets of another party, or liabilities to policy holders, or have represented to customers that they have conveyed assets to another party. The party which owns the assets or policy, or who has entrusted assets with the custodian, is referred to herein as a "customer" of the custodian.

The present inventor has recognized a flaw in existing auditing procedures. When an auditor is hired by an investment custodian, the auditor uses the records of customer accounts that the custodian provides. The auditor usually does not have the ability to discover accounts which the custodian has kept secret and separate. Hence, unethical custodians may keep a separate set of books that the auditor is unaware of, and the mismanaged or fraudulent transactions may thus be kept from the auditor.

Because of existing regulations and current auditing procedures, a custodian's customers are led to believe that their investment accounts are held intact. In fact, the auditor may never see the records of a particular customer if they are hidden from the auditor by the custodian. The present invention addresses this flaw by providing an auditing database system. This auditing database system may provide auditors with a source of information that is independent of the records provided by the investment custodian. This information may include information relating to the customer accounts that is provided by the customers themselves. If the ability to input information is made available to customers and some of custodian's customers provide information relating to their accounts to the auditing database system in accordance with embodiments of the invention, then the auditor will be able to discover the existence of those customer accounts which the custodian attempted to conceal but which were reported by the customer. As a result any attempt to conceal accounts or to misrepresent the activity in the accounts has some chance of being revealed and this invention presents a new risk to the perpetrators of fraud that their fraud will be discovered.

Various embodiments of the invention may be used in a wide variety of applications where a financial or investment custodian is handling accounts for customers. These applications may include various types of custodians including stockbrokers, hedge funds, trust companies, depositories, insurance companies, insurance agencies, banks, savings and loans, credit unions, and any other institutions which holds funds or has financial obligations to customers.

The present invention may be implemented in many possible ways. Some of possibilities include the voluntary adoption by individual or groups of custodians. There will be a strong incentive for custodians to advertise and adopt the present invention for a number of reasons. For example, the custodians who advertise and adopt the invention will gain a competitive advantage due to the perception by the customers of a higher level of security against fraud and mismanagement. As customers become aware of the existence of the auditing database system of the present invention, the may demand that their custodians participate in the system. Alternatively, regulatory agencies, such as the SEC and state insurance commissions, may require the auditing database system of the present invention to be adopted and advertised to protect consumers.

In other applications of the invention, the information provided by the auditing database of the invention may be used by other parties besides an auditor. For example, such information may be used by law enforcement, or in legal proceedings when possible fraudulent investment activity is being investigated. Of course, the security of the information contained in the auditing database of the invention will need to be safeguarded, and should only be revealed when it is legally permitted or required.

Referring now to FIG. 1, there is shown an audited custodial account database system 10 in accordance with an embodiment of the invention. The audited custodial account database system 10 includes a database system 12, which may comprise a relational database system, which includes a relational database management system. Examples of such relational databases and relational database management systems include products available from Oracle, IBM, Microsoft, Sybase, Teradata and others.

The database system 12 receives information from a customer through a customer interface 14 and also receives information from a custodian through a custodian interface 16. The information provided through the customer interface 14, may include information such as the names of custodians that the customer has accounts with, the physical location of the custodian, the virtual location (e.g. website) of the custodian, the name of the person responsible for the customer's accounts at the particular custodian, the customer's account numbers at the custodian, the total value of assets on particular date or dates, a list of the customer's assets managed by the custodian, the name and contact information of the customer, and any other information that may be useful to the auditing system and/or an auditor. This information may be provided by the customer directly or by an intermediary providing this service for the customer.

The information provided through the custodian interface 16 may include information such as the name of the custodian, the names of the human brokers working for the custodian, a list of the custodian's customers, the custodian's physical and virtual locations, a list of the assets managed by the custodian, verifiable asset locations, the date of the asset list and the total amount of the assets, and any other information that may be useful to the auditing system and/or the auditor. This information may be provided by the custodian directly, or by an intermediary providing this service for the custodian.

The information received from the customer interface 14 is received by the database system 12 and stored in a customer database 18. In response to the customer's submission, which may be in the form of a submission to an auditing database system website, the database system 12 may provide a confirmation reply to the customer. This reply may comprise an email, or other form of communication, informing the customer that the information has been received. If there is some problem with the information, the database system 12 may include in the confirmation reply a request for additional information or clarification. Such a problem may be detected automatically by the database system, for example, when a field is missing, or when an analysis detects some inconsistency in the data submitted by the customer. This analysis may be performed automatically by the database system, or in some embodiments, a human analyst may review the data submitted and determine that clarification and/or additional information is needed. The confirmation reply sent from the database system 12 to the customer interface 14, may also include an estimated date by which the customer can expect an audit to be performed, and also a date by which the customer can expect another response from the auditing database system 10 indicating the results of the audit. In particular, after the audit, this response may come from the auditor (as described in more detail below) stating whether the customer information matched, or did not match, the information received from the custodian interface 16.

The information received from the custodian interface 16 is stored in a custodian database 20. The database system 12 performs a sort operation on the data using a sort processor 21 in the customer database 18 and the custodian database 20. This sort operation may include sorting the information by custodian names, human broker names, custodian physical and virtual addresses, and other variables. Techniques for performing such sort operations are well-known to those skilled the field of relational databases.

Once the information in the database system 12 is sorted, a customer/custodian matching system 22 accesses the sorted information and attempts to find matches between the sorted customer information and the sorted custodian information. These matches may be found using a merge operation, which will be familiar to those skilled in the field of relational databases. Assuming that all the information provided by the customers and the custodians is accurate and complete, the customer/custodian matching system 22 will find matches between the information relating to customer accounts provided by the customers and the information regarding the same accounts provided by the custodians. That is, for example, a customer named John may have provided information relating to a particular account number having $1,000 in assets on Jan. 1, 2009, which is managed by custodian named Fred. Custodian may have also submitted information that it had a customer named John with an account having the same account number with assets of $1,000 on Jan. 1, 2009. In this example there is a match between all the parameters and the existence of the match may be sent to a matching customer processor 24. Information relating to the matching customers will then be made available to an auditor through an auditor interface 26.

In other situations the customer/custodian matching system may not have found matches. For example, the amount of the assets may not match, or an account submitted by a customer may be completely missing from the information provided by the custodian. Such situations will be flagged by the unmatched customers unit 28 and this information may then be provided to an auditor through the auditor interface. In such situations, the auditor will likely have a responsibility to investigate and/or report the discrepancy in its audit. Such discrepancy will, in most cases, be sufficient to reveal fraudulent activity on the part of the custodian.

The auditor may use the auditing interface unit 26 to communicate the results of the audit to the customer interface unit 14 through a customer/auditor interface unit 29. For example, such communication from the auditor to the customer may state that the audit was complete and that all the information regarding the customer's account matched, or did not match, the information provided by the custodian. Where there was not a match, this communication may state the nature of the discrepancy and provide a recommended course of action for the customer to remedy the situation. The recommended course of action for the customer may include communication with the auditor so that nonfraudulent explanations can be made when pertinent.

A number of refinements may be employed to facilitate the efficient handling of information by the audited custodial account database system 10. For example, where there is a discrepancy in the asset value or other information that does not exceed a pre-selected dollar value, the customer/custodian matching system 22 may be programmed to ignore such discrepancies. Similarly, minor discrepancies between the names of customers, custodians, account numbers, etc, may also be filtered out and ignored. In addition, while embodiments of the audited custodial account database system 10 may be designed to operate automatically; human input may be employed at various stages of the process to deal with mistakes and minor discrepancies in the data. In other embodiments of the invention, various relational database techniques used for dealing with uncertainties and less than exact specifications in the data may be employed. For example, the above described sort and merge operations when being performed on uncertain data may be facilitated using a Monte Carlo approach, such as the one described in Ravi Jampani et al, "MCDB: A Monte Carlo Approach to Managing Uncertain Data", SIGMOD '08, Jun. 9-12, 2008, Vancouver, BC, Canada ACM 978-1-60558-102-6/08/06, which is incorporated herein by reference.

Figure 2:
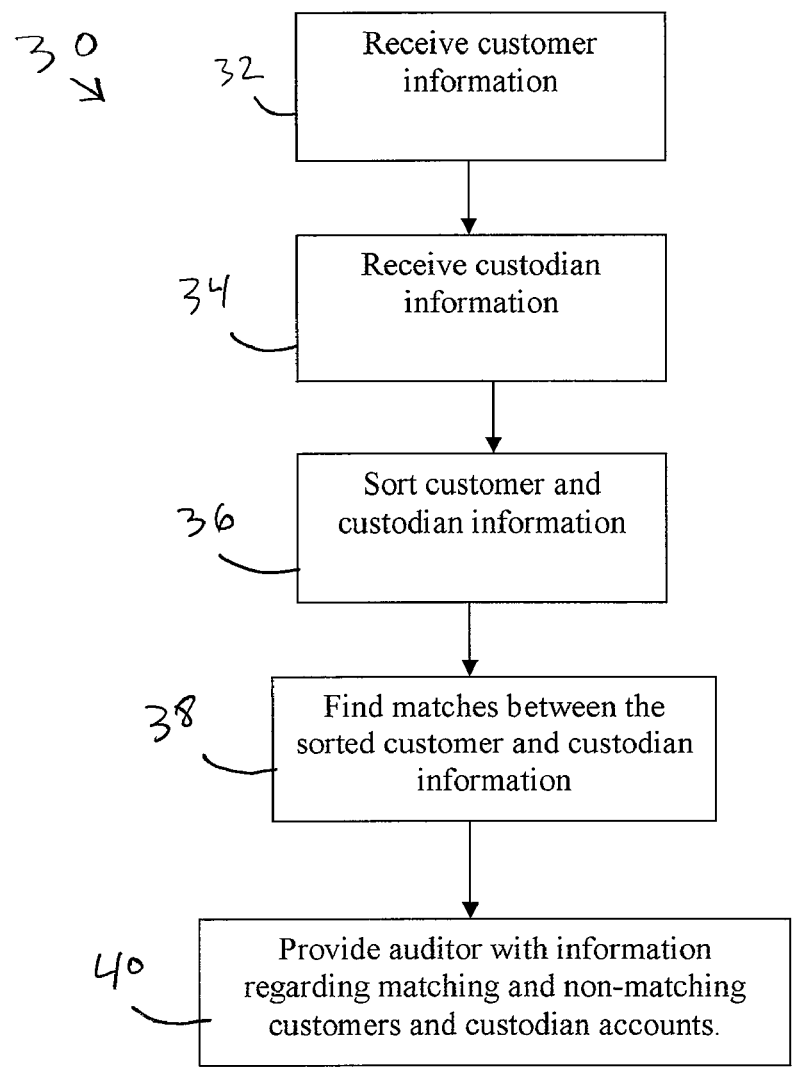
FIG. 2 shows a diagram of a flowchart of a method of using the auditing database system shown in FIG. 1 in accordance with an embodiment of the invention.

FIG. 2 shows a diagram of a flowchart of a method 30 of using the auditing database system shown in FIG. 1 in accordance with an embodiment of the invention. In block 32, customer information is received. Custodian information is received, in block 34. Customer and custodian information is sorted, in block 36. In block 38, matches are found between the sorted customer and custodian information. The matching and non-matching information is provided as output in block 40.

As can be seen from the above disclosure, embodiments of the invention provide ways to facilitate the auditing of custodian accounts. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
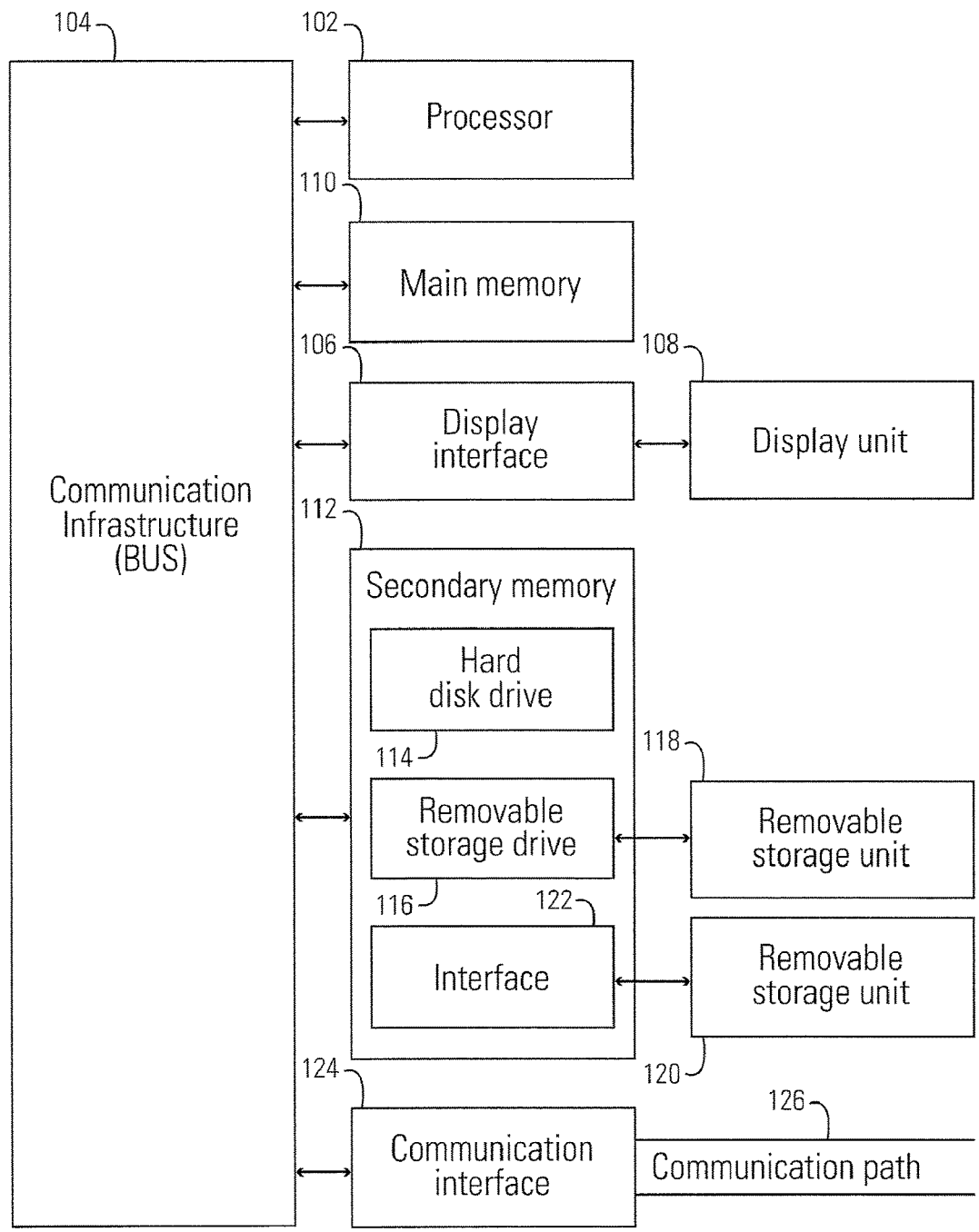
FIG. 3 shows a high level block diagram of an information processing system useful for implementing one embodiment of the present invention.

FIG. 3 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:

an auditing database system that is at least partly implemented in special purpose hardware and software including an auditing database system website implemented at least partly in special purpose hardware and software receiving customer and custodian information;

a customer interface unit that is implemented at least partly in special purpose hardware and software receiving customer information directly from a customer with assets under custodian management, the customer information identifying at least one custodian and identifying assets managed by the custodian, wherein the customer uses the auditing database system website to self-report an existence of assets managed by the custodian to the auditing database system;

a customer database unit that is implemented at least partly in special purpose hardware and software receiving the customer information from the auditing database system website;

custodian interface unit that is implemented at least partly in special purpose hardware and software receiving custodian information relating to the customer's and the custodian's customers' assets managed by the custodian;

a custodian database unit that is at least partly implemented in special purpose hardware and software receiving custodian information from the custodian interface unit relating to the custodian's customers and the custodian's customers' assets managed by the custodian;

sorting unit that is implemented at least partly in special purpose hardware and software receiving data from the customer database unit and from the custodian database unit and performing a sort operation on the received data;

customer and custodian matching processor that is at least partly implemented in special purpose hardware and software for identifying matches between the customer and custodian information including identifying any of the information provided by the customer which was missing from the received custodian information from a corresponding custodian;

matching customer processing unit implemented at least partly in special purpose hardware and software receiving information relating to all of the matches between the information received from particular customers and the information received from the custodian relating to the corresponding particular customers;

unmatched customer processing unit implemented at least partly in special purpose hardware and software receiving information relating to all of the non-matches between the information received from particular customers and the information received from the custodian relating to the corresponding particular customers and wherein the unmatched customer processing unit flags the existence of unmatched customer information and outputs the flag;

said auditing database system having therein an auditor interface unit that is at least partly implemented in special purpose hardware and software for outputting information relating to the existence of matches between customer and custodian information received from the matching customer processing unit and information related to the existence of non-matches between customer and custodian information received from the unmatched customer processing unit, wherein the auditor interface unit receives the flag from the unmatched customer processing unit, and outputs the flag, whereby the outputted information related to the existence of matches and non-matches and the flag is available to an auditor through the auditor interface unit is for use by the auditor to perform an audit on the custodian to verify the existence of assets corresponding to the customer information; and customer/auditor interface unit that is at least partly implemented in special purpose hardware and software receiving the matching, non-matching and flag information from the auditor interface unit and sending said information to the customer interface unit, whereby said information including the flagged information is available to said customer through the customer interface unit.

2. The system according to claim 1, wherein said database system is a relational database system.

3. The system according to claim 1, wherein said customer information includes information relating to assets owned by said customer and controlled by said custodian.

4. The system according to claim 1, wherein said customer information includes information relating to an identity of at least one custodian of said assets.

5. The system according to claim 1, wherein said custodial information includes a list of customers of said custodian.

6. The system according to claim 1, wherein said custodial information includes the value of assets in customer accounts at a given point in time.

7. The system according to claim 1, wherein said custodian and customer matching processor identifies differences between the information relating to the value of assets in custodian accounts provided by customers and the value of assets in corresponding custodian accounts provided by a corresponding custodian.

8. The method according to claim 1, wherein the sorting unit uses further a Monte Carlo technique for performing said sorting and finding matches.

9. The system according to claim 1 wherein the sorting unit includes a relational database performs a sort operation that sorts the information for the information in the custodian database and the customer database including sorting the information by one or more of: customer name, human broker names, custodian physical addresses and custodian virtual addresses.

10. The system according to claim 1 wherein the matching customer processor unit provides the auditor interface with information relating to matches between the dollar value of assets in a customer account received from customer and the value of assets in a custodian account received from a custodian.

11. The system according to claim 1 wherein the unmatched customer processor unit provides the auditor interface with information relating to non-matches between the dollar value of assets in a customer account received from customer and the value of assets in a corresponding customer account received from a custodian and generates a flag when said dollar value of assets does not match.

12. The system according to claim 1 wherein the unmatched customer processor unit provides the auditor interface with information relating to non-matches between the existence of a customer account received from customer and the existence of a customer account received from a custodian and generates a flag when said non-match occurs.

13. A method comprising:
receiving through a customer interface unit implemented at least partly in special purpose hardware and software on an auditing database system website implemented at least partly in special purpose hardware and software, customer information directly from a customer with assets under custodian management, the customer information identifying at least one custodian and identifying assets managed by the custodian, wherein the customer uses the auditing database system website to self-report an existence of assets managed by the custodian to the auditing database system;
storing the customer information on a customer database implemented at least partly in special purpose hardware and software;
receiving through a custodian interface unit implemented at least partly in special purpose hardware and software on the auditing database system custodian information from a custodian relating to the custodian's customers and the custodian's customers' assets managed by said custodian;
performing a sort operation using a sorting unit that is implemented at least partly in special purpose hardware and software on data received from the customer database unit and data received from the custodian database unit;
identifying any of the information provided by the customer contained in the received customer information which was missing from the received custodian information from a corresponding custodian using a customer-custodian matching processor unit implemented at least partly in special purpose hardware and software;
receiving information relating to all of the matches between the information received from particular customers and the information received from the custodian relating to the corresponding particular customers in a matching customer processing unit implemented at least partly in special purpose hardware and software;
receiving information relating to all of the non-matches between the information received from particular customers and the information received from the custodian relating to the corresponding particular customers in an unmatched customer processing unit implemented at least partly in special purpose hardware and software;
flagging the existence of unmatched customer information and outputting the flag using the unmatched customer processing unit;
outputting information relating to the existence of matches between customer and custodian information received from the matching customer processing unit and information related to the existence of non-matches between customer and custodian information received from the unmatched customer processing unit using an auditing interface unit implemented at least partly in special purpose hardware and software;
receiving the flag from the unmatched customer processing unit and outputting the flag using the auditor interface unit, whereby the outputted information related to the existence of matches and non-matches and the flag is available to an auditor through the auditor interface unit;
and
receiving the matching, non-matching and flag information from the auditor interface unit in a customer/auditor interface unit that is implemented at least partly in special purpose hardware and software and sending said information to the customer interface unit, whereby said information including the flagged information is available to said customer through the customer interface unit.

14. The method according to claim 13 wherein said performing an audit further comprising performing an audit of said custodian using said provided information regarding matching and non-matching customer and custodian information.

15. The method according to claim 13 further comprising identifying discrepancies between the information relating to asset values in said received customer information and the information relating to asset values in said received custodian information from a corresponding custodian.

16. The method according to claim 13 further comprising receiving custodian information from the custodian interface unit through a communications network in the customer database unit.

17. A computer program product for facilitating an audit, said computer program product comprising:
a non-transitory computer readable storage medium having computer readable program code embodied therewith, said computer readable program code comprising:
computer readable program code configured to:
receiving through a customer interface unit that is implemented at least partly on special purpose hardware and software on an auditing database system website that is implemented at least partly on special purpose hardware and software customer information directly from a customer with assets under custodian management, the customer information identifying at least one custodian and identifying assets managed by the custodian, wherein the customer uses the auditing database system website to self-report an existence of assets managed by the custodian to the auditing database system;
storing the customer information on a customer database implemented at least partly in special purpose hardware and software;
receiving through a custodian interface unit implemented at least partly on special purpose hardware and software on the auditing database system custodian information from a custodian relating to the custodian's customers and the custodian's customers' assets managed by said custodian;
performing a sort operation using a sorting unit that is implemented at least partly in special purpose hardware and software on data received from the customer database unit and data received from the custodian database unit;

identifying any of the information provided by the customer contained in the received customer information which was missing from the received custodian information from a corresponding custodian using a customer-custodian matching processor unit implemented at least partly on special purpose hardware and software;

receiving information relating to all of the matches between the information received from particular customers and the information received from the custodian relating to the corresponding particular customers in a matching customer processing unit implemented at least partly in special purpose hardware and software;

receiving information relating to all of the non-matches between the information received from particular customers and the information received from the custodian relating to the corresponding particular customers in an unmatched customer processing unit implemented at least partly in special purpose hardware and software;

flagging the existence of unmatched customer information and outputting the flag using the unmatched customer processing unit;

outputting information relating to the existence of matches between customer and custodian information received from the matching customer processing unit and information related to the existence of non-matches between customer and custodian information received from the unmatched customer processing unit using an auditing interface unit implemented at least partly on special purpose hardware and software;

receiving the flag from the unmatched customer processing unit and outputting the flag using the auditor interface unit, whereby the outputted information related to the existence of matches and non-matches and the flag is available to an auditor through the auditor interface unit;

and receiving the matching, non-matching and flag information from the auditor interface unit in a customer/auditor interface unit that is implemented at least partly in special purpose hardware and software and sending said information to the customer interface unit, whereby said information including the flagged information is available to said customer through the customer interface unit.

18. The computer program product according to claim 17, wherein said customer is an investor and said custodian is a stockbroker.

19. The computer program product according to claim 17, wherein said custodian is an insurance company.

* * * * *